US012670255B2

(12) United States Patent
Usui et al.

(10) Patent No.: US 12,670,255 B2
(45) Date of Patent: Jun. 30, 2026

(54) GENERATION DEVICE AND ASSOCIATED METHODOLOGY FOR GENERATING INDICATORS OF COMPROMISE CORRESPONDING TO SCRIPT-TYPE MALWARE

(71) Applicant: NTT, Inc., Tokyo (JP)

(72) Inventors: Toshinori Usui, Musashino (JP);
Tomonori Ikuse, Musashino (JP);
Yuhei Kawakoya, Musashino (JP);
Makoto Iwamura, Musashino (JP)

(73) Assignee: NTT, Inc., Tokyo (JP)

( * ) Notice: Subject to any disclaimer, the term of this patent is extended or adjusted under 35 U.S.C. 154(b) by 100 days.

(21) Appl. No.: 18/706,812

(22) PCT Filed: Nov. 16, 2021

(86) PCT No.: PCT/JP2021/042134
§ 371 (c)(1),
(2) Date: May 2, 2024

(87) PCT Pub. No.: WO2023/089674
PCT Pub. Date: May 25, 2023

(65) Prior Publication Data
US 2025/0021651 A1      Jan. 16, 2025

(51) Int. Cl.
*G06F 21/53* (2013.01)
*G06F 21/55* (2013.01)
*G06F 21/56* (2013.01)

(52) U.S. Cl.
CPC .......... *G06F 21/566* (2013.01); *G06F 21/564* (2013.01); *G06F 21/53* (2013.01)

(58) Field of Classification Search
CPC ...... G06F 21/566; G06F 21/564; G06F 21/53; G06F 21/55; G06F 21/56
See application file for complete search history.

(56) References Cited

U.S. PATENT DOCUMENTS 8,850,588 B2 * 9/2014 Kumar ................ H04L 63/1425
726/25
9,171,253 B1 * 10/2015 Wright ..................... G06N 5/02
(Continued)

FOREIGN PATENT DOCUMENTS

AU      2010250015 A1 * 12/2011 ........... G06F 21/577

OTHER PUBLICATIONS

Doll et al., "Automated Pattern Inference Based on Repeatedly Observed Malware Artifacts", Proceedings of the 14th International Conference on Availability, Reliability and Security, Aug. 26-29, 2019, 10 pages.

(Continued)

*Primary Examiner* — Jayesh M Jhaveri
(74) *Attorney, Agent, or Firm* — XSENSUS LLP

(57) ABSTRACT

A generation device includes processing circuitry configured to acquire behavior information related to behavior of malware and collection information related to date and time when the malware is collected, classify the malware into a first group based on the behavior information, classify the malware classified into the first group into a second group based on the collection information, detect an activity trace of the malware from the behavior information, and generate trace information of the malware from the activity trace indicated by the malware classified into the second group.

7 Claims, 11 Drawing Sheets

(56) References Cited

U.S. PATENT DOCUMENTS

| | | | |
|---|---|---|---|
| 2007/0136455 A1* | 6/2007 | Lee ........................ | G06F 21/564 |
| | | | 709/223 |
| 2013/0097706 A1* | 4/2013 | Titonis .................. | G06F 21/566 |
| | | | 726/22 |
| 2015/0161523 A1* | 6/2015 | Antonov ............... | G06F 16/285 |
| | | | 706/12 |
| 2017/0063893 A1* | 3/2017 | Franc ..................... | G06F 21/53 |
| 2017/0277727 A1* | 9/2017 | Chen ..................... | G06F 16/215 |
| 2022/0327210 A1* | 10/2022 | Ogawa .................. | G06F 21/562 |

OTHER PUBLICATIONS

Kurogome et al. "EIGER: Automated IOC Generation for Accurate and Interpretable Endpoint Malware Detection", Proceedings of the 35th Annual Computer Security Applications Conference, Dec. 9-13, 2019, pp. 687-701.

* cited by examiner

GENERATION DEVICE AND ASSOCIATED METHODOLOGY FOR GENERATING INDICATORS OF COMPROMISE CORRESPONDING TO SCRIPT-TYPE MALWARE

CROSS-REFERENCE TO RELATED APPLICATION

This application is a national stage application, pursuant to 35 U.S.C. § 371, of International Patent Application No. PCT/JP2021/042134, filed Nov. 16, 2021, the entire contents of which are incorporated herein by reference.

TECHNICAL FIELD

The present invention relates to a generation device, a generation method, and a generation program.

BACKGROUND ART

In recent years, as malware has become more sophisticated, there have been an increase in malware in which detection is difficult by conventional anti-virus software that detects based on signature. In addition, detection by a dynamic analysis sand box for operating transmitted and received files in an isolated analysis environment and detecting the malware from the degree of malignancy of the observed behavior is also present, however, the analysis environment has been sensed and avoided by a method for viewing the degree of divergence from a general user environment or the like.

From such a background, a malware countermeasure technique called EDR (Endpoint Detection and Response) has been used. In the EDR, behavior of a terminal is continuously monitored by using an agent installed in the terminal of a user instead of the environment prepared for analysis. Then, the malware is detected by using trace information (IOC: Indicator of Compromise) which is a signature of so-called behavior for detecting a trace left when the malware is activated, and which is prepared in advance. Specifically, the EDR collates the behavior observed at the terminal with the IOC, and detects that there is a possibility of infection with the malware when they match.

Therefore, the possibility of detection of the malware by the EDR depends on whether IOC useful for detection of certain malware is retained. On the other hand, if the IOC matches with the trace of activity of not only malware but also normal software, there is a problem that erroneous detection is caused. Therefore, it is necessary to selectively extract traces useful for detection to make IOC instead of making IOC of the traces of malware to increase the number in the dark.

In addition, from the viewpoint of the IOC in which EDR can be collated at a time, it is necessary to selectively extract the traces useful for detection to make the IOC. That is, since EDR generally takes time for collation as many IOCs exist, it is desirable to have a combination of IOCs for detecting more types of malwares with a smaller number of IOCs. In this case, if the IOC is generated from the activity trace which is not useful for the detection, the collation time is unnecessarily taken.

Currently, new malware has been produced daily, and the corresponding IOC continues to change. Therefore, in order to continuously cope with them, it is necessary to automatically analyze the malware to extract traces of activity and generate IOC. The IOC is generated on the basis of activity traces obtained by analyzing the malware. Generally, the IOC is obtained by collecting traces obtained by executing while monitoring the behavior of the malware, normalizing the traces, or selecting a combination suitable for detection. From the above, a technique for selectively and automatically extracting the activity traces useful for detecting the malware is desired.

For example, in NPL 1, a method of extracting patterns of traces repeatedly observed among a plurality of pieces of malware and using the patterns as the IOC is proposed. In addition, in NPL 2, a method of automatically generating an IOC which is easy for a human to understand by extracting a set of traces co-occurring among malware of the same family and preventing complexity of the IOC from being increased by an optimization method of the set is proposed. According to these methods, it is possible to automatically extract the IOC that can contribute to the detection of malware from the execution trace log.

Here, the execution trace is to track the execution state of the program by recording behaviors from various viewpoints in order during execution. In addition, in order to realize this, a program having a function of monitoring and recording behavior is called a tracer. For example, an API (Application Programming Interface) executed and recorded in order is called an API trace, and a program for realizing the API trace is called an API tracer.

CITATION LIST

Non Patent Literature

[NPL 1] Christian Doll et al. "Automated Pattern Inference Based on Repeatedly Observed Malware Artifacts." Proceedings of the 14th International Conference on Availability, Reliability and Security. 2019.
[NPL 2] Yuma Kurogome et al. "EIGER: Automated IOC Generation for Accurate and Interpretable Endpoint Malware Detection." Proceedings of the 35th Annual Computer Security Applications Conference. 2019.

SUMMARY OF INVENTION

Technical Problem

However, the above-mentioned conventional technique has a problem that only the generation of IOC to executable binary-type malware is targeted, and the generation of IOC to script-type malware is not considered. Here, the script-type malware is different from the executable binary-type malware, and does not generally have a clear family. Note that the family represents a race of malware and groups together malware having similar features.

In the methods described in NPL 1 and NPL 2, IOC is generated based on traces of activities commonly seen in the same family. Therefore, it is difficult to apply these methods to the script-type malware having no clear family to generate the effective IOC.

In particular, in the script-type malware, even if behavior is similar, the trace of activity may change greatly as time passes. Therefore, even if the family is determined based only on the similarity of behavior such as conventional executable binary-type malware, variation in activity traces can be increased. As a result, it may not be possible to generate the effective IOC in common for the same family.

In view of the above-described circumstances, an object of the present invention is to provide a generation device, a generation method, and a generation program that enable effective generation of IOC even for the script-type malware.

Solution to Problem

In order to solve the above-mentioned problem and achieve the object, a generation device includes processing circuitry configured to acquire behavior information related to behavior of malware and collection information related to date and time when the malware is collected, classify the malware into a first group based on the behavior information, classify the malware classified into the first group into a second group based on the collection information, detect an activity trace of the malware from the behavior information, and generate trace information of the malware from the activity trace indicated by the malware classified into the second group are included.

In addition, a generation method is a generation method executed by a generation device, and the generation method includes acquiring behavior information related to behavior of malware and collection information related to date and time when the malware is collected, classifying the malware into a first group based on the behavior information, classifying the malware classified into the first group into a second group based on the collection information, detecting an activity trace of the malware from the behavior information, and generating trace information of the malware from the activity trace indicated by the malware classified into the second group are included.

Further, a non-transitory computer-readable recording medium stores therein a generation program that causes a computer to execute a process including acquiring behavior information related to behavior of malware and collection information related to date and time when the malware is collected, classifying the malware into a first group based on the behavior information, classifying the malware classified into the first group into a second group based on the collection information, detecting an activity trace of the malware from the behavior information, and generating trace information of the malware from the activity trace indicated by the malware classified into the second group.

Advantageous Effects of Invention

The present invention effectively enables the generation of IOC to the script-type malware.

DESCRIPTION OF EMBODIMENTS

In the following, embodiments of a trace information generation device (appropriately referred to as generation device), a trace information generation method (appropriately referred to as generation method), and a trace information generation program (appropriately referred to as generation program) according to the present invention will be described in detail with reference to the drawings. Note that the present invention is not limited to the embodiments to be described below.

[First Embodiment] In the following, a configuration of a trace information generation system, a configuration of the trace information generation device, an overview of classification processing, and a flow of trace information generation processing according to the present embodiment will be described in order, and finally the effects of the present embodiment will be described.

Figure 1:
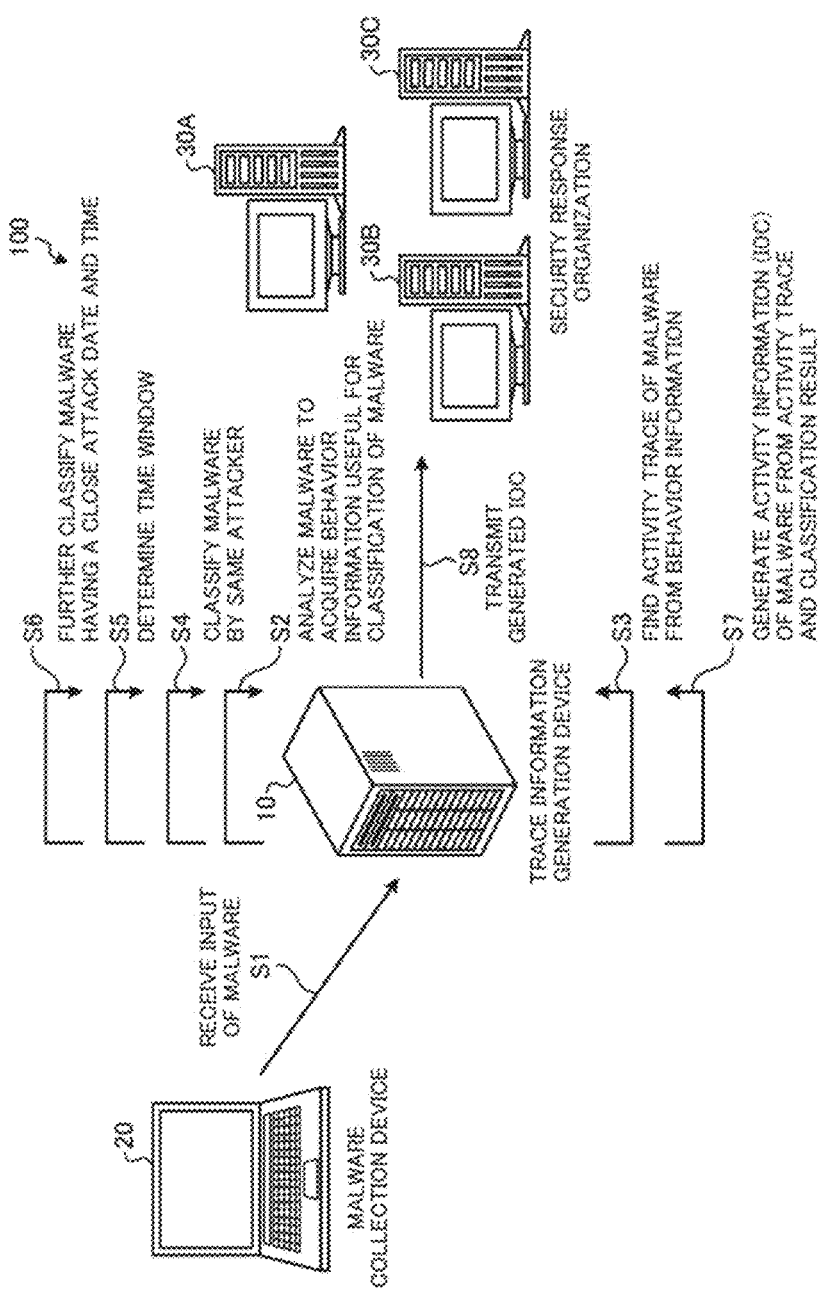
FIG. 1 is a diagram showing a configuration example of a trace information generation system according to a first embodiment.

[Configuration of Trace Information Generation System] A configuration of trace information generation system (appropriately referred to as present system) 100 according to the present embodiment will be described in detail with reference to FIG. 1. FIG. 1 is a diagram showing a configuration example of trace information generation system according to a first embodiment. The present system 100 includes a trace information generation device 10, a malware collection device 20 functioning as a sensor, and security response organization 30 (30A, 30B, 30C) such as an SOC (Security Operation Center) and a CSIRT (Computer Security Incident Response Team). Here, the trace information generation device 10, the malware collection device 20, and the security response organization 30 are communicatively connected to each other by wire or wireless means via a predetermined communication network, which is not shown. Note that the trace information generation system 100 shown in FIG. 1 may include a plurality of trace information generation devices 10 and a plurality of malware collection devices 20.

(Malware Collection Processing) First, the trace information generation device 10 receives input of malware from the malware collection device 20 (step S1). Here, the malware collection device 20 is a dedicated equipment for collecting malware information such as malware sharing service for research such as VirusTotal, CSIRT in an organization, and honeypot, but is not particularly limited. The malware collection device 20 may be a PC (Personal Computer), a smartphone, a tablet terminal, or the like owned by a user of a general network, or the like.

(Behavior Information Acquisition Processing) Next, the trace information generation device 10 analyzes the malware whose input is received, and acquires behavior information which is useful for classification of the malware and related to behavior of the malware (step S2). At this time, the trace information generation device 10 acquires the behavior information including features (e.g.: API trace information, file metadata) having high similarity between subspecies. The subspecies here refers to malware which is created by the same attacker and which has high similarity to each other from the viewpoint of behavior, for example. Note that detailed malware behavior information acquisition processing by the trace information generation device 10 will be described later in [Flow of Behavior Information Acquisition Processing]. In addition, the trace information generation device 10 acquires the collection information related to the collection date and time of malware whose input is received.

(Activity Trace Detection Processing) On the other hand, the trace information generation device 10 finds an activity trace of malware from the acquired behavior information (step S3). At this time, the trace information generation device 10 lists in advance parts (e.g.: operations of files and registries, process generation and communication) where traces are likely to remain during activity, and detects them as activity traces when they appear in the analysis results. Note that the detailed activity trace detection processing by the trace information generation device 10 will be described later in [Flow of Activity Trace Detection Processing].

(First Classification Processing) Subsequently, the trace information generation device 10 extracts features (appropriately referred to as "malware feature") of malware indicating that the attacker is the same from the acquired behavior information, and classifies the malware (step S4). At this time, the trace information generation device 10 clusters on the basis of the extracted features of malware, and creates a cluster for each feature of the attacker. Note that the detailed first classification processing by the trace information generation device 10 will be described later in [Flow of First Classification Processing].

Here, features such as API trace and metadata included in the behavior information are generally highly similar among subspecies of malware. Therefore, by clustering based on such features, it is expected that the subspecies of malware are classified into the same cluster. In addition, the detection in the same IOC can be expected by first collecting those who have a high possibility of malware by the same attacker from the similarity of behavior, that is, the similarity of attack methods.

(Time Window Determination Processing) Next, the trace information generation device 10 determines a time window corresponding to a time section of attack of malware in order to use it in the second classification processing (step S5). Here, a fixed value may be manually determined and used in the time window by investigating a tendency of past malware, and the like, or a value may be dynamically determined by paying attention to change of a tendency of a character string of activity trace. In the latter case, the trace information generation device 10 determines the time window from the activity trace of malware. At this time, the trace information generation device 10 clusters the malware on the basis of the similarity of the character string of activity trace, and divides the time window by assuming that a new tendency has started each time the malware of outlier occurs. Note that the detailed time window determination processing by the trace information generation device 10 will be described later in [Flow of Time Window Determination Processing].

(Second Classification Processing) Further, the trace information generation device 10 further classifies the malware having a close attack date and time from the collection date and time of malware indicated by the collection information (step S6). At this time, the trace information generation device 10 further classifies the clusters of the same attacker by using the time window determined by the processing of the step S5. Note that the detailed second classification processing by the trace information generation device 10 will be described later in [Flow of Second Classification Processing].

Here, the reason why the classification processing is performed by introducing the time window is that malware by the same attacker may have significantly different activity traces when the dates and times used in the attacks are greatly different. In consideration of this, it is expected that more effective IOC is generated from the activity trace which has the same classification destinations and the close date and time used for the attack to each other.

(IOC Generation Processing) Then, the trace information generation device 10 generates an IOC (trace information) of malware from the activity trace and the classification result (step S7). At this time, the trace information generation device 10 virtually regards the malware belonging to the same classification destination and time window as the same family, so that a conventional IOC generation technique can be applied, and IOC is generated. Note that the detailed IOC generation processing by the trace information generation device 10 will be described later in [Flow of IOC Generation Processing].

(IOC Transmission Processing) Finally, the trace information generation device 10 transmits the generated IOC to the security response organization 30 (step S8). A terminal or the like to which the trace information generation device 10 transmits the IOC is not particularly limited.

As described above, the trace information generation system 100 according to the present embodiment analyzes the malware to acquire the behavior information useful for the classification, collects the malware having similar features based on the behavior information, among the malware of the same classification destination, the malware whose date and time used for the attack is within a specific range is further collected, a virtual family is created based on them, and the IOC is generated from the activity trace. Thus, in the present system 100, the IOC can be generated even for the malware having no family information such as script-type malware.

In addition, as mentioned above, the present system 100 is useful for generating the IOC for malware having no family information, and is suitable for automatically generating the IOC from such malware. Therefore, in the present system 100, by generating the IOC to be inputted to the EDR, the EDR can be operated more effectively, and countermeasures can be taken for malware effective in SOC, CSIRT, etc.

Figure 2:
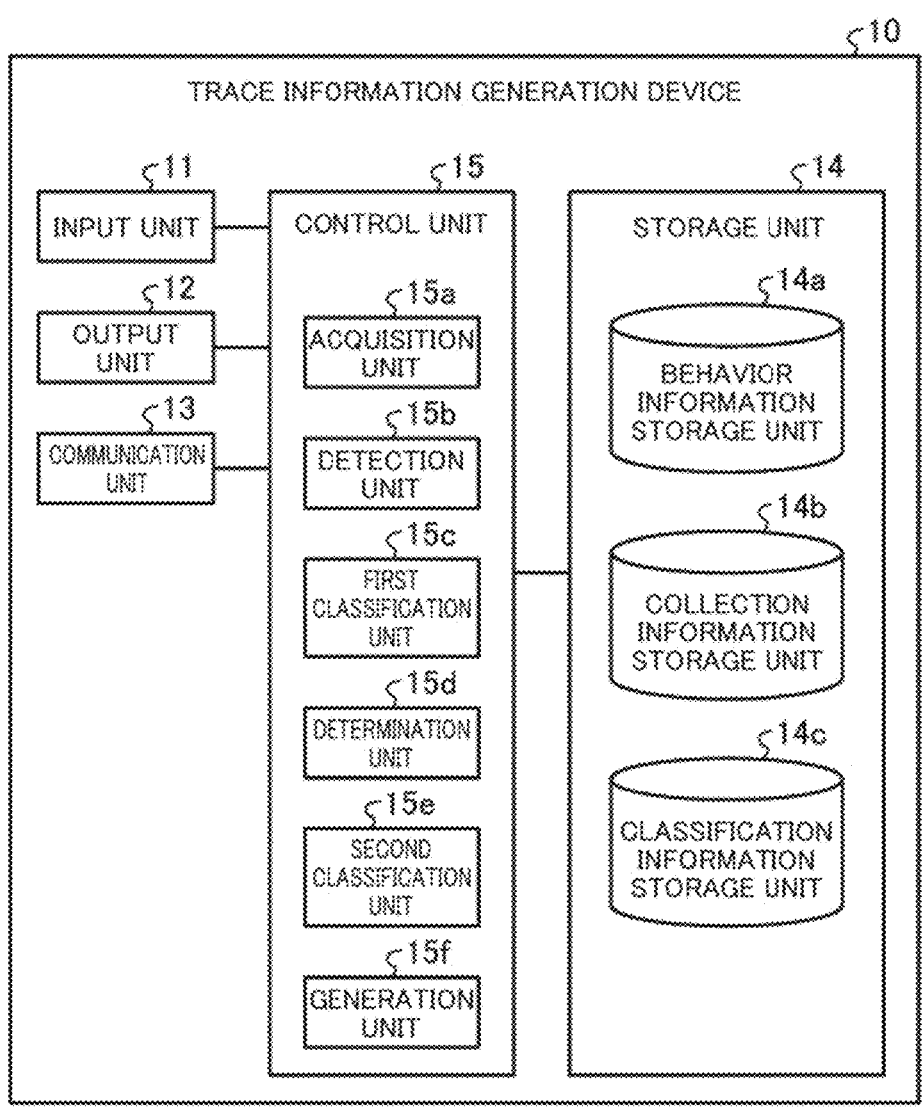
FIG. 2 is a block diagram showing a configuration example of a trace information generation device according to the first embodiment.

[Configuration of Trace Information Generation Device] The configuration of trace information generation device 10 according to the present embodiment will be described in detail with reference to FIG. 2. FIG. 2 is a block diagram showing a configuration example of the trace information generation device according to the first embodiment. The trace information generation device 10 includes an input unit 11, an output unit 12, a communication unit 13, a storage unit 14, and a control unit 15.

(Input Unit 11) The input unit 11 serves to input various types of information to the trace information generation device 10. The input unit 11 is a mouse, a keyboard, or the like and receives input of setting information or the like to the trace information generation device 10, for example.

(Output Unit 12) The output unit 12 serves to output various types of information from the trace information generation device 10. The output unit 12 is a display or the like, and outputs setting information or the like stored in the trace information generation device 10, for example.

(Communication Unit 13) The communication unit 13 serves to perform data communication with another device. The communication unit 13 performs data communication with each communication device, for example. In addition, the communication unit 13 can perform data communication with a terminal of an operator, which is not shown.

(Storage Unit 14) The storage unit 14 stores various types of information referred to when the control unit 15 operates and various types of information acquired when the control unit 15 operates. The storage unit 14 includes a behavior information storage unit 14a, a collection information storage unit 14b, and a classification information storage unit 14c. Here, the storage unit 14 is a semiconductor memory element such as a RAM (Random Access Memory) or a flash memory, or a storage device such as a hard disk or an optical disc, or the like. Note that in an example of FIG. 2, the storage unit 14 is installed inside the trace information generation device 10, but the storage unit 14 may be installed outside the trace information generation device 10, and a plurality of storage units may be installed.

(Behavior Information Storage Unit 14a) The behavior information storage unit 14a stores the behavior information. For example, the behavior information storage unit 14a stores an API trace related to network communication, file operation, registry operation or process generation acquired by an acquisition unit 15a of the control unit 15. In addition, the behavior information storage unit 14a may store a value (metadata) of a header part of a malware file acquired by the acquisition unit 15a. Further, the behavior information storage unit 14a may store the collection information related to the collection date and time of the malware acquired by the acquisition unit 15a in association with the behavior information.

(Collection Information Storage Unit 14b) The collection information storage unit 14b stores the collection information. For example, the collection information storage unit 14b stores the collection date and the collection time point for each malware collected by the malware collection device 20 as the collection information.

(Classification Information Storage Unit 14c) The classification information storage unit 14c stores the classification information. For example, the classification information storage unit 14c stores classification destination information indicating a classification destination of malware classified by a first classification unit 15c and time window information indicating malware belonging to the same time window classified by a second classification unit 15e as the classification information.

(Control Unit 15) The control unit 15 serves to control the entire trace information generation device 10. The control unit 15 includes an acquisition unit 15a, a detection unit 15b, a first classification unit 15c, a determination unit 15d, a second classification unit 15e, and a generation unit 15f. Here, the control unit 15 is an electronic circuit such as a CPU (Central Processing Unit) or an MPU (Micro Processing Unit), or an integrated circuit such as an ASIC (Application Specific Integrated Circuit) or an FPGA (Field Programmable Gate Array), for example.

(Acquisition Unit 15a) The acquisition unit 15a acquires the behavior information related to the behavior of malware. For example, the acquisition unit 15a executes the malware in an isolated environment, and acquires an API trace related to a called API as the behavior information. In the specific example, the acquisition unit 15a executes the malware in the isolated environment, and acquires the API trace in which the called API is recorded together with an argument and a return value and which is related to, especially, network communication, file operation, registry operation or process generation. In addition, the acquisition unit 15a may acquire the metadata obtained by investigating a value of the header part of the malware file. Note that the acquisition unit 15a may use static analysis not executing the malware, instead of dynamic analysis executing the malware. On the other hand, the acquisition unit 15a stores the acquired behavior information in the behavior information storage unit 14a.

The acquisition unit 15a acquires the collection information related to the date and time when the malware is collected. For example, the acquisition unit 15a acquires the collection date and the collection time point for each malware collected by the malware collection device 20 as the collection information. On the other hand, the acquisition unit 15a may store the collection information acquired in the collection information storage unit 14b.

(Detection Unit 15b) The detection unit 15b detects the activity trace of malware from the behavior information. For example, the detection unit 15b lists in advance a part where a trace is likely to remain during the activity of malware, and detects the trace appearing in the listed part as the activity trace of malware. In a specific example, the detection unit 15b detects the activity trace from the API trace related to the network communication, the file operation, the registry operations or the process generation as a part where a trace is likely to remain. On the other hand, the detection unit 15b may store the activity trace of the detected malware in the storage unit 14.

(First Classification Unit 15c) The first classification unit 15c classifies the malware into a first group based on the behavior information. For example, the first classification unit 15c extracts features having high similarity between subspecies from the behavior information, clusters based on the extracted features, and classifies the malware into the first group. In a specific example, the first classification unit 15c extracts malware features to be used for classification of malware by the same attacker from the behavior information acquired by the acquisition unit 15a, clusters based on the extracted malware features, and classifies the malware features into the first group for each malware by the same attacker. On the other hand, the first classification unit 15c stores the classification destination information related to the classified first group in the classification information storage unit 14c.

Note that in the clustering, a hierarchical method such as Ward's method or a non-hierarchical method such as K-means may be used. The methods are not limited to those, as long as they are capable of grouping together subspecies of malware.

(Determination Unit 15d) The determination unit 15d determines the time window indicating a time section based on the collection information in order to capture the malware having the tendency of the same activity trace. Here, in the determination of the time window, a fixed value may be manually determined by investigating the tendency of the past malware, or a value may be dynamically determined by paying attention to a change in the tendency of the character string of the activity trace. For example, the determination unit 15d determines a period in which the same tendency is seen in the activity trace as the time window, and inputs it to the second classification unit 15e.

(Second Classification unit 15e) The second classification unit 15e further classifies the malware classified into the first group into a second group based on the collection information. For example, the second classification unit 15e further classifies the malware belonging to a set time window among the malware classified into the first group into the second group by using the time window indicating a time section based on the collection information. In a specific example, the second classification unit 15e sets the time window of a predetermined length from the collection information acquired by the acquisition unit 15a, and further classifies the malware of the same attacker and having the collection date and time in the same time window as the second group by dividing the first group classified by the first classification unit 15c by the time window. On the other hand, the second classification unit 15e stores the time window information related to the classified second group in the classification information storage unit 14c.

(Generation Unit 15f) The generation unit 15f generates the trace information of malware from the activity trace indicated by the malware classified into the second group. For example, the generation unit 15f generates the trace information (IOC) of malware from the activity trace indicated by the malware of the same attacker and having the collection date and time in the same time window. At this time, the generation unit 15f generates the trace information obtained by replacing character strings other than the common character string with a symbol representing an arbitrary character string in order to detect a file name including the common character string detected as the activity trace, for example, but the method for generating the trace information is not particularly limited.

Figure 3:
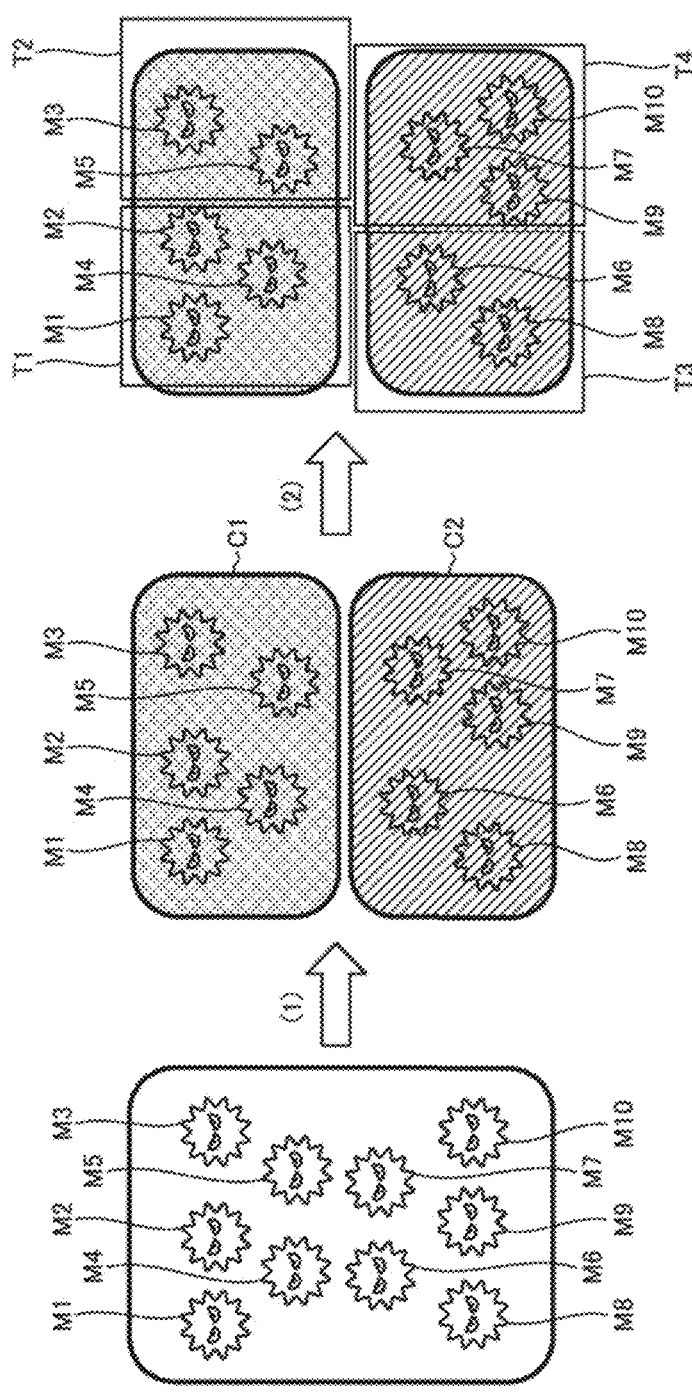
FIG. 3 is a diagram showing an overview of classification processing according to the first embodiment.

[Overview of Classification Processing] An overview of the first classification processing and the second classification processing according to the present embodiment will be described with reference to FIG. 3. FIG. 3 is a diagram showing an overview of the classification processing according to the first embodiment.

(Overview of First Classification Processing) The trace information generation device 10 analyzes the collected malware and clusters the malware based on the features of the behavior of the malware (see FIG. 3 (1)). In the example of FIG. 3, the trace information generation device 10 classifies the malware of 10 specimens of the malware M1 to M10 into a cluster C1 (M1 to M5) and a cluster C2 (M6 to M10). Therefore, in the first classification processing, the malware by the same attacker can be classified by classifying the malware on the basis of the commonality of the behavior of malware or the like.

(Overview of Second Classification Processing) The trace information generation device 10 classifies the clustered malware for each time window indicating that the malware has been collected in the same time zone (see FIG. 3 (2)). In an example of FIG. 3, the trace information generation device 10 classifies M1, M2, and M4 into the time window T1, and classifies M3 and M5 into the time window T2 among the malware classified into the cluster C1. In addition, similarly, the trace information generation device 10 classifies M6 and M8 into the time window T3, and classifies M7, M9, and M10 into the time window T4 among the malware classified into the cluster C2. Therefore, in the second classification processing, the malware having the close date and time used for the attack among the same attacker can be classified by further classifying the malware on the basis of the collection date and time of malware, for example.

Figure 4:
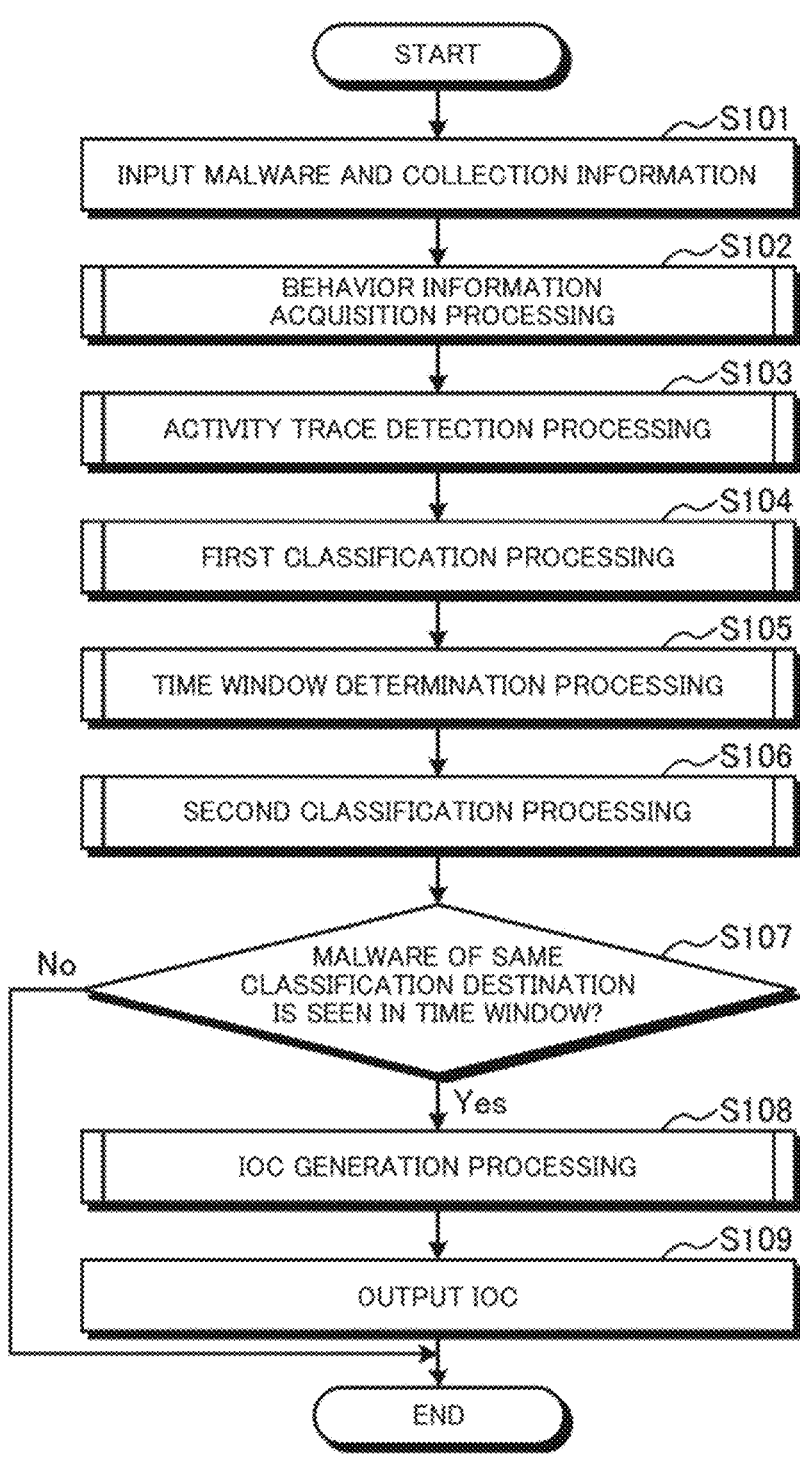
FIG. 4 is a flowchart showing an example of an overall flow of trace information generation processing according to the first embodiment.

[Overall Flow of Trace Information Generation Processing] An overall flow of trace information generation processing according to the present embodiment will be described in detail with reference to FIG. 4. FIG. 4 is a flowchart showing an example of an overall flow of trace information generation processing according to the first embodiment. Note that the following steps S101 to S109 can also be executed in a different order. In addition, some processing may be omitted among the following steps S101 to S109.

First, the input unit 11 of the trace information generation device 10 receives input of malware to be a target of generating the trace information (IOC) and input of collection information related to the date and time when the malware is collected from the malware collection device 20 (step S101). At this time, the input unit 11 may receive input of malware information from equipment other than the malware collection device 20.

(Behavior Information Acquisition Processing) The acquisition unit 15a executes the behavior information acquisition processing (step S102). Note that the detailed behavior information acquisition processing by the acquisition unit 15a will be described later in [Flow of Behavior Information Acquisition Processing]. In addition, the acquisition unit 15a acquires the collection information of malware whose input is received by the input unit 11.

(Activity Trace Detection Processing) The detection unit 15b executes the activity trace detection processing (step S103). Note that the detailed activity trace detection processing by the detection unit 15b will be described later in [Flow of Activity Trace Detection Processing].

(First Classification Processing) The first classification unit 15c executes the first classification processing (step S104). Note that the detailed first classification processing by the first classification unit 15c will be described later in [Flow of First Classification Processing].

(Time Window Determination Processing) The determination unit 15d executes the time window determination processing (step S105). Note that the detailed time window determination processing by the determination unit 15d will be described later in [Flow of Time Window Determination Processing].

(Second Classification Processing) The second classification unit 15e executes the second classification processing (step S106). Note that the detailed second classification processing by the second classification unit 15e will be described later in [Flow of Second Classification Processing].

At this time, when the malware of the same classification destination is seen in the time window (step S107: Yes), the second classification unit 15e shifts to IOC generation processing of a step S108. On the other hand, when the malware of the same classification destination cannot be seen in the time window (step S107: No), the second classification unit 15e terminates the processing.

(IOC Generation Processing) The generation unit 15f executes the IOC generation processing (step S108). Note that the detailed IOC generation processing by the generation unit 15f will be described later in [Flow of IOC Generation Processing].

Finally, the output unit 12 outputs the IOC generated in the processing of the step S108 (step S109), and terminates the processing. In addition, the communication unit 13 may transmit the generated IOC to the security response organization 30.

[Flow of Each Processing] The flow of each processing of the trace information generation processing according to the present embodiment will be described in detail with reference to FIG. 5 to FIG. 10. Hereinafter, the flow of behavior information acquisition processing, the flow of activity trace detection processing, the flow of first classification processing, the flow of time window determination processing, the flow of second classification processing, and the flow of TOC generation processing will be described in the order.

Figure 5:
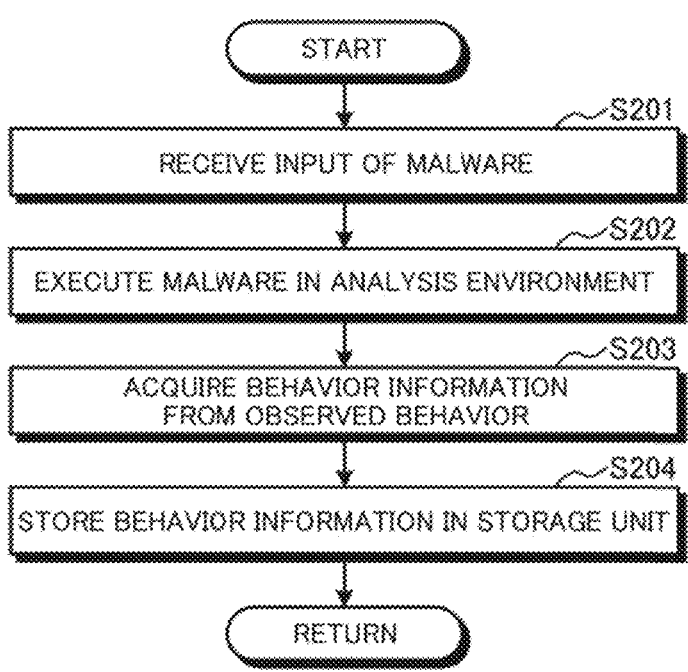
FIG. 5 is a flowchart showing an example of a flow of behavior information acquisition processing according to the first embodiment.

(Flow of Behavior Information Acquisition Processing) A flow of behavior information acquisition processing according to the present embodiment will be described in detail with reference to FIG. 5. FIG. 5 is a flowchart showing an example of a flow of behavior information acquisition processing according to the first embodiment. Note that the following steps S201 to S204 can also be executed in a different order. In addition, some processing may be omitted among the following steps S201 to S204.

The acquisition unit 15a receives the input of malware (step S201), executes the malware in the analysis environment (step S202), acquires the behavior information from the observed behavior (step S203), stores the behavior information in the storage unit 14 (step S204), and repeats the behavior information acquisition processing.

Figure 6:
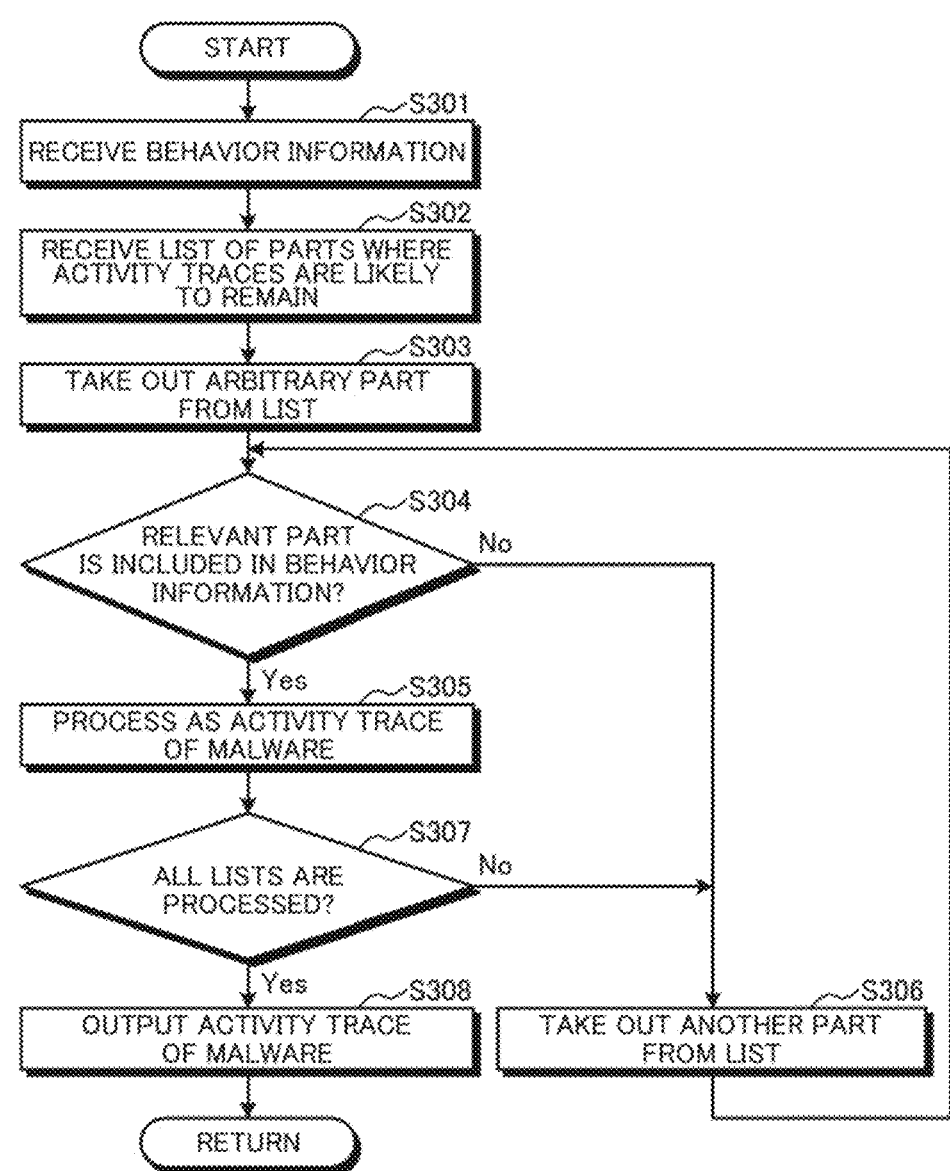
FIG. 6 is a flowchart showing an example of a flow of activity trace detection processing according to the first embodiment.

(Activity Trace Detection Processing) A flow of activity trace detection processing according to the present embodiment will be described in detail with reference to FIG. 6. FIG. 6 is a flowchart showing an example of a flow of activity trace detection processing according to the first embodiment. Note that the following steps S301 to S308 can also be executed in a different order. In addition, some processing will be omitted among the following steps S301 to S308.

The detection unit 15b receives the behavior information (step S301), receives the list of parts where activity traces are likely to remain (step S302), and extracts an arbitrary part from the list (step S303). At this time, when the behavior information includes the relevant part (step S304: Yes), the detection unit 15b processes the part as the activity trace of malware (step S305). On the other hand, when the behavior information does not include the relevant part (step S304: No), the detection unit 15b takes out another part from the list (step S306) and shifts to the processing of step S304. Subsequently, when all the lists are processed by the processing of the step S305 (step S307: Yes), the detection unit 15b outputs the activity trace of malware (step S308), and repeats the activity trace detection processing. On the other hand, when all the lists are not processed by the processing of the step S305 (step S307: No), the detection unit 15b takes out another part from the list (step S306) and shifts to the processing of the step S304.

Figure 7:
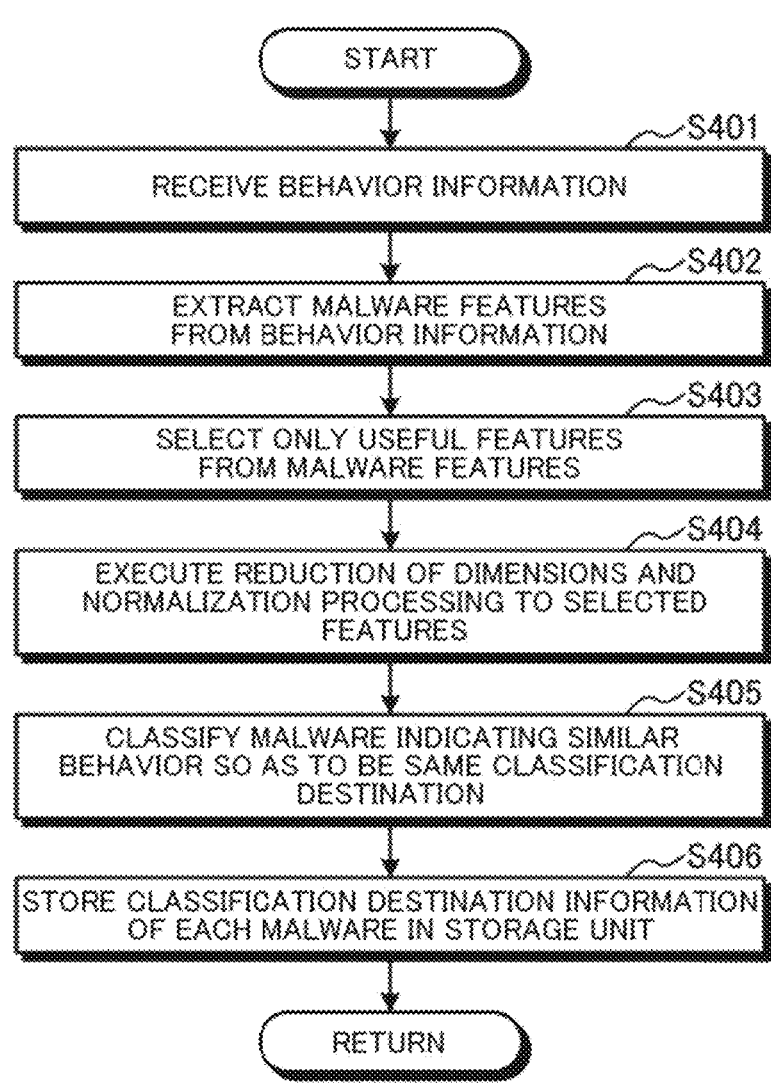
FIG. 7 is a flowchart showing an example of a flow of first classification processing according to the first embodiment.

(Flow of First Classification Processing) A flow of first classification processing according to the present embodiment will be described in detail with reference to FIG. 7. FIG. 7 is a flowchart showing an example of a flow of first classification processing according to the first embodiment. Note that the following steps S401 to S406 can also be executed in a different order. In addition, some processing will be omitted among the following steps S401 to S406.

The first classification unit 15c receives the behavior information (step S401), extracts malware features from the behavior information (step S402), selects only useful features from the malware features (step S403), executes reduction of dimensions and normalization processing to the selected features (step S404), classifies the malware indicating similar behavior so as to be the same classification destination (step S405), stores the classification destination information of each malware in the storage unit 14 (step S406), and repeats the first classification processing.

Figure 8:
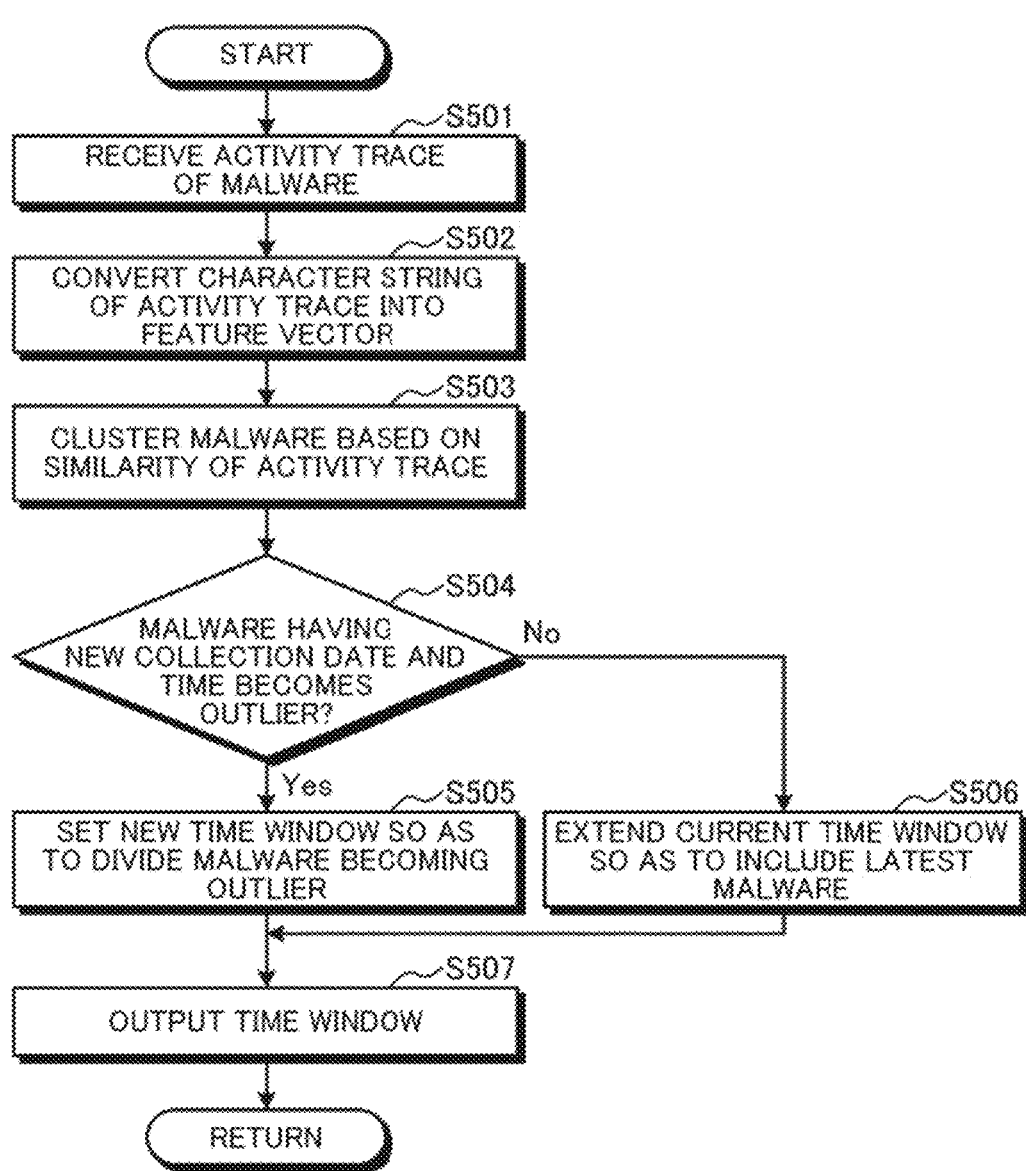
FIG. 8 is a flowchart showing an example of a flow of time window determination processing according to the first embodiment.

(Flow of Time Window Determination Processing) A flow of time window determination processing according to the present embodiment will be described in detail with reference to FIG. 8. FIG. 8 is a flowchart showing an example of a flow of time window determination processing according to the first embodiment. Note that the following steps S501 to S507 can also be executed in a different order. In addition, some processing will be omitted among the following steps S501 to S507.

The determination unit 15d receives the activity trace of malware (step S501), converts the character string of activity trace into a feature vector (step S502), and clusters the malware on the basis of the similarity of activity trace (step S503). At this time, when the malware having the new collection date and time becomes an outlier (step S504: Yes), the determination unit 15d sets a new time window so as to divide the malware becoming the outlier (step S505), outputs the time window (step S507), and repeats the time window determination processing. On the other hand, when the malware having the new collection date and time is not the outlier (step S504: No), the determination unit 15d extends the current time window so as to include the latest malware (step S506), outputs the time window (step S507), and repeats the time window determination processing.

Figure 9:
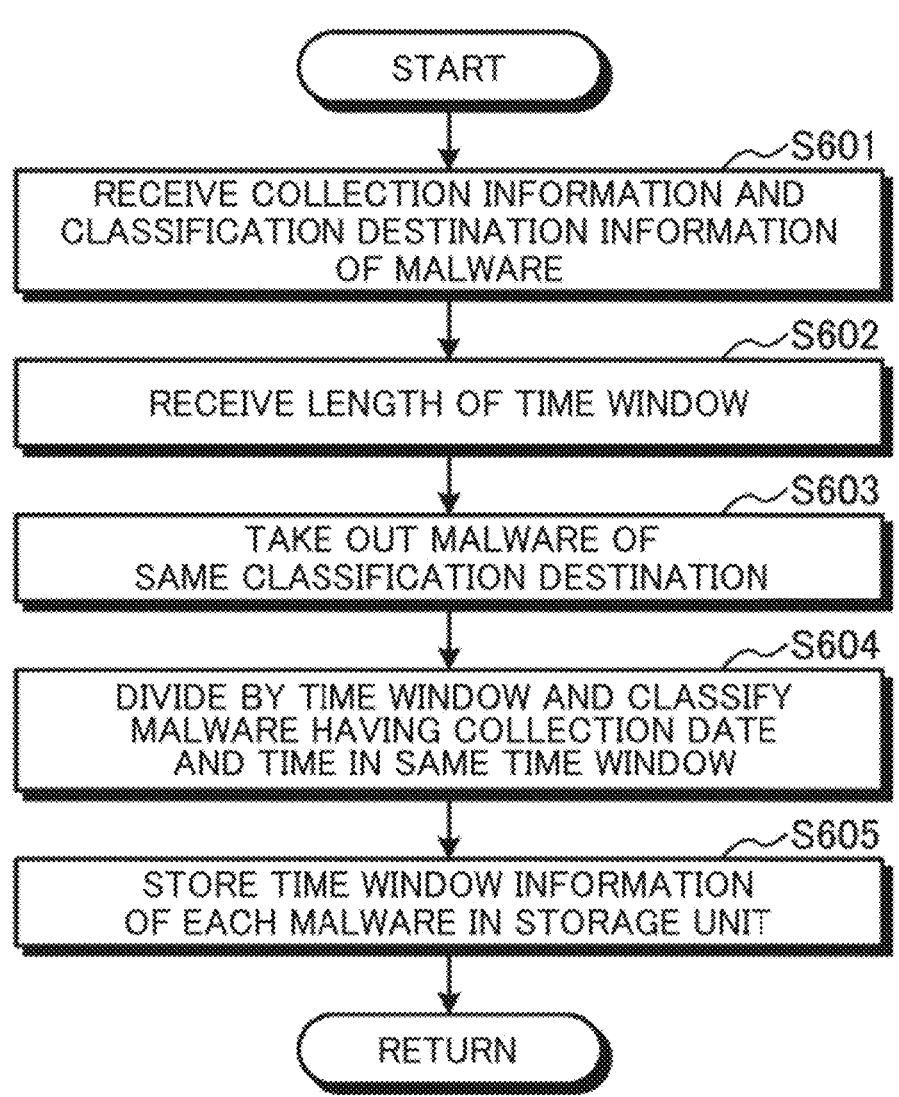
FIG. 9 is a flowchart showing an example of a flow of second classification processing according to the first embodiment.

(Second Classification Processing) A flow of second classification processing according to the present embodiment will be described in detail with reference to FIG. 9. FIG. 9 is a flowchart showing an example of a flow of second classification processing according to the first embodiment. Note that the following steps S601 to S605 can also be executed in a different order. In addition, some processing will be omitted among the following steps S601 to S605.

The second classification unit 15e receives the collection information and classification destination information of malware (step S601), receives the length of the time window to be set (step S602), takes out the malware of the same classification destination (step S603), divides by the time window and classifies the malware having the collection date and time in the same time window (step S604), stores the time window information of each malware in the storage unit 14 (step S605), and repeats the second classification processing.

Figure 10:
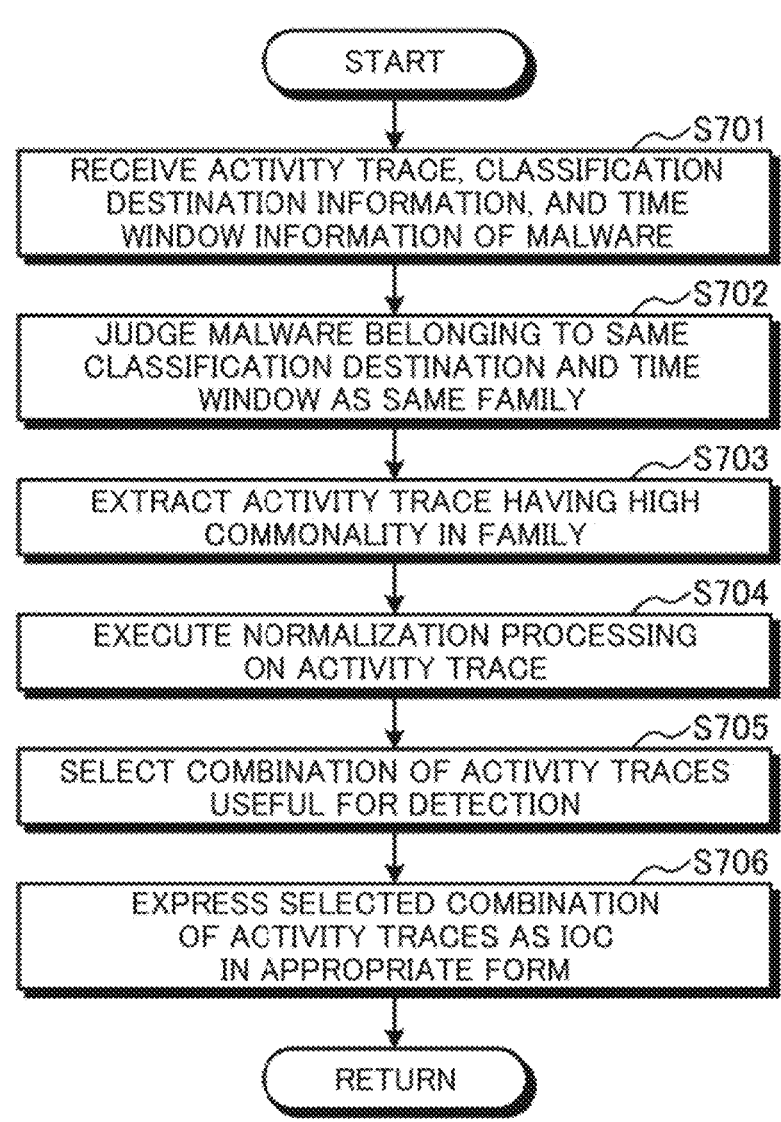
FIG. 10 is a flowchart showing an example of a flow of IOC generation processing according to the first embodiment.

(IOC Generation Processing) A flow of IOC generation processing according to the present embodiment will be described in detail with reference to FIG. 10. FIG. 10 is a flowchart showing an example of a flow of IOC generation processing according to the first embodiment. Note that the following steps S701 to S706 can also be executed in a different order. In addition, some processing will be omitted among the following steps S701 to S706.

The generation unit 15f receives the activity trace of malware, the classification destination information, and the time window information (step S701), judges the malware belonging to the same classification destination and time window as the same family (step S702), extracts the activity traces having high commonality in the family (step S703), executes the normalization processing on the activity traces (step S704), selects a combination of activity traces useful for detection (step S705), expresses the selected combination of activity traces as IOC in an appropriate format (step S706), and repeat the IOC generation processing.

[Effects of First Embodiment] In the first place, in the trace information generation processing according to the present embodiment described above, the behavior information related to the behavior of malware and collection information related to the date and time when the malware is collected are acquired, the malware is classified into the first group based on the behavior information, the malware classified into the first group is classified into the second group based on the collection information, the activity trace of malware is detected from the behavior information, and the trace information of malware is generated from the activity trace indicated by the malware classified into the second group. Therefore, the present processing can effectively generate the IOC even for the script-type malware.

In the second place, in the trace information generation processing according to the present embodiment, the malware belonging to the set time window among the malware classified into the first group is further classified into the second group by using the time window indicating the time section based on the collection information. Therefore, in the present processing, the IOC can be effectively generated even for the script-type malware by classifying the malware into a group to be an alternative of the malware family.

In the third place, in the trace information generation process according to the present embodiment, the malware is clustered based on the similarity of the character string of the activity trace, and the time window is determined based on the change in the tendency of the clustered malware. Therefore, in the present processing, the IOC can be effectively generated even for the script-type malware by continuously classifying the group to be the alternative of the malware family.

In the fourth place, in the trace information generation process according to the present embodiment, the malware is executed in the isolated environment, and the API trace related to the called API is acquired as the behavior information. Therefore, in the present processing, the IOC can be effectively generated even for the script-type malware by acquiring the information including the similarity of malware behavior.

In the fifth place, in the trace information generation processing according to the present embodiment, features having high similarity between subspecies are extracted from the behavior information, and clustering is performed on the basis of the features, and the malware is classified into the first group. In the present processing, the IOC can be effectively generated even for the script-type malware by more efficiently classifying the malware into group to be the alternative of the malware family.

In the sixth place, in the trace information generation process according to the present embodiment, the activity trace of malware is detected from the API trace related to the network communication, the file operation, the registry operation or the process generation. In the present processing, the IOC can be effectively generated even for the script-type malware by more efficiently detecting the activity trace of malware.

[System Configuration etc.] Each component of each device shown according to the above-described embodiment is based on a functional concept and does not necessarily have to be physically configured as shown. That is, the specific forms of distribution and integration of each device are not limited to the diagrams shown in the figures, and all or part of them can be configured by functionally or physically distributing and integrating them in any unit in accordance with various loads, use situations, or the like. Further, All or any part of processing functions which are performed by each device can be realized by a CPU and a program analyzed and executed by the CPU, or realized as hardware using wired logic.

Also, among the processing described in the above-described embodiment, all or some processing that is described as being automatically executed may also be manually executed, or all or some of processing that is described as being manually executed may also be automatically executed using a known method. In addition, the processing procedure, the control procedure, specific names, information including various data and parameters that are shown in the above-described document and drawings may be arbitrarily changed unless otherwise described.

[Program] In addition, it is also possible to create a program in which processing executed by the trace information generation device 10 described in the above-described embodiment is written in a computer-executable language. In this case, the same effects as in the above-described embodiment can be provided by causing a computer to execute the program. Further, processing similar to those of the above-described embodiment may be also realized by recording the program in a computer-readable recording medium, and causing the computer to load and execute the program recorded in this recording medium.

Figure 11:
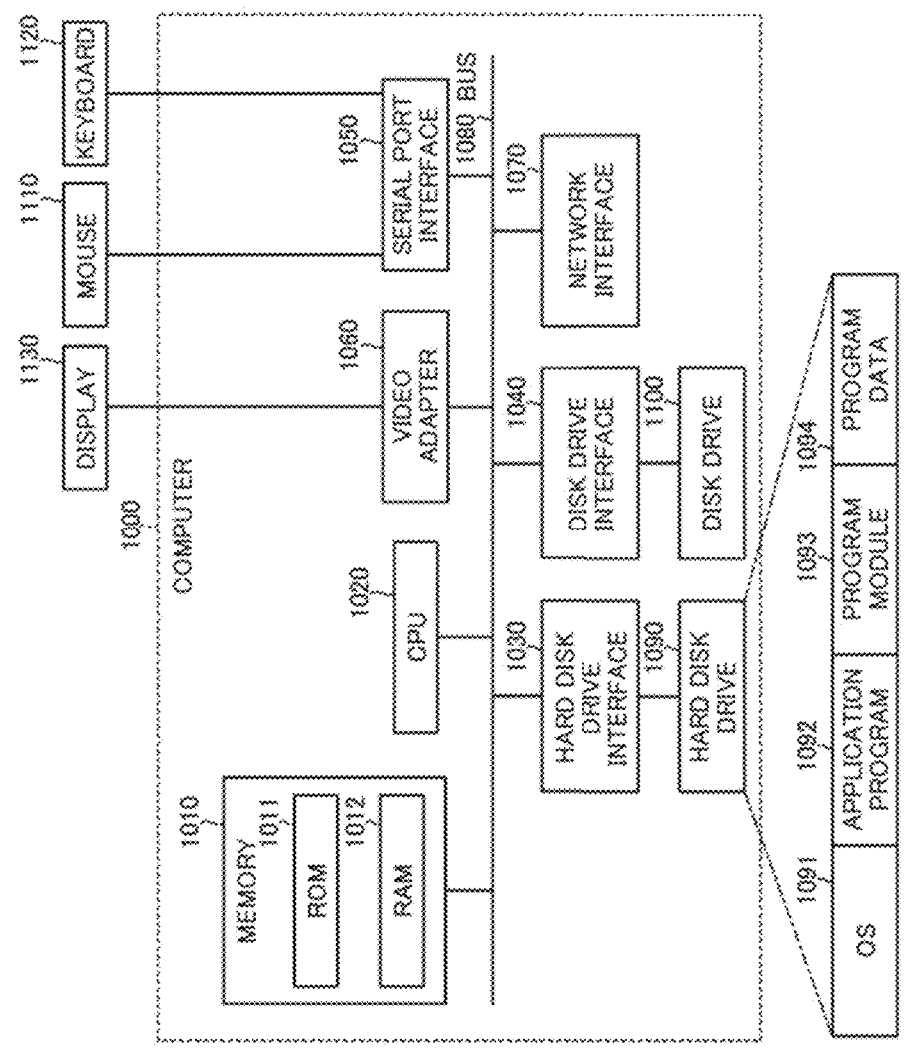
FIG. 11 is a diagram showing a computer that executes a program.

FIG. 11 is a diagram showing the computer that executes the program. As exemplified in FIG. 11, a computer 1000 includes a memory 1010, a CPU 1020, a hard disk drive interface 1030, a disk drive interface 1040, a serial port interface 1050, a video adapter 1060, and a network interface 1070, for example, and these units are connected by a bus 1080.

As exemplified in FIG. 11, the memory 1010 includes a ROM (Read Only Memory) 1011 and a RAM 1012. The ROM 1011 stores a boot program such as a BIOS (Basic Input Output System), for example. As exemplified in FIG. 11, the hard disk drive interface 1030 is connected to a hard disk drive 1090. As exemplified in FIG. 11, the disk drive interface 1040 is connected to a disk drive 1100. For example, a removable storage medium such as a magnetic disk or an optical disc is inserted into the disk drive 1100. As exemplified in FIG. 11, the serial port interface 1050 is connected to a mouse 1110 and a keyboard 1120, for example. As exemplified in FIG. 11, the video adapter 1060 is connected to a display 1130, for example.

Here, as exemplified in FIG. 11, the hard disk drive 1090 stores an OS 1091, an application program 1092, a program module 1093, and program data 1094, for example. That is, the above-described program is stored in the hard disk drive 1090, for example, as the program module in which instructions to be executed by the computer 1000 are described.

Also, various types of data described in the above-described embodiment is stored as program data, in the memory 1010 or the hard disk drive 1090, for example. Then, the CPU 1020 reads the program module 1093 or the program data 1094 stored in the memory 1010 or the hard disk drive 1090 onto the RAM 1012 as needed, and executes various types of processing procedures.

Note that the program module 1093 and the program data 1094 related to the program does not need to be stored in the hard disk drive 1090, and may also be stored in a removable storage medium, for example, and read by the CPU 1020 via the disk drive or the like. Alternatively, the program module 1093 and the program data 1094 related to the program may also be stored in another computer that is connected via a network (LAN (Local Area Network), WAN (Wide Area Network), or the like) and read by the CPU 1020 via the network interface 1070.

The above-described embodiment and modification thereof are included in the technique disclosed by the present application, as well as in the scope of the invention described in the claims and the equivalent range.

REFERENCE SIGNS LIST

10 Trace information generation device (generation device)

11 Input unit
12 Output unit
13 Communication unit
14 Storage unit
14a Behavior information storage unit
14b Collection information storage unit
14c Classification information storage unit
15 Control unit
15a Acquisition unit
15b Detection unit
15c First classification unit
15d Determination unit
15e Second classification unit
15f Generation unit
20 Malware collection device
30, 30A, 30B, 30C Security response organization
100 Trace information generation system

The invention claimed is:

1. A generation device comprising:
processing circuitry configured to:
    acquire behavior information related to behavior of malware and collection information related to date and time when the malware is collected;
    classify the malware into a plurality of first groups based on the behavior information;
    classify the malware classified into each of the plurality of first groups into a plurality of second groups based on the collection information;
    detect an activity trace of the malware from the behavior information; and
    generate trace information of the malware from the activity trace indicated by the malware classified into the plurality of second groups,
    wherein the processing circuitry is further configured to execute the malware in an isolated environment, and acquire an API (Application Programming Interface) trace related to an API called during the malware execution as the behavior information.

2. The generation device according to claim 1, wherein the processing circuitry is further configured to classify the malware belonging to a time window among the malware classified into the plurality of first groups into the plurality of second groups by using the time window indicating a time section based on the collection information.

3. The generation device according to claim 2, wherein the processing circuitry is further configured to cluster the malware based on similarity between character strings of activity traces and determine the time window based on a change in tendency of the clustered malware.

4. The generation device according to claim 1, wherein the processing circuitry is further configured to extract features having high similarity between subspecies from the behavior information, cluster based on the features, and classify the malware into the plurality of first groups.

5. The generation device according to claim 1, wherein the processing circuitry is further configured to detect the activity trace from an API trace related to network communication, file operation, registry operation, or process generation.

6. A generation method executed by a generation device, the generation method comprising:
    acquiring behavior information related to behavior of malware and collection information related to date and time when the malware is collected;
    classifying the malware into a plurality of first groups based on the behavior information;
    classifying the malware classified into the plurality of first groups into a plurality of second groups based on the collection information;
    detecting an activity trace of the malware from the behavior information; and
    generating trace information of the malware from the activity trace indicated by the malware classified into the plurality of second groups,
    wherein the generation method further includes executing the malware in an isolated environment, and acquiring an API (Application Programming Interface) trace related to an API called during the malware execution as the behavior information.

7. A non-transitory computer-readable recording medium storing therein a generation program that causes a computer to execute a process comprising:
    acquiring behavior information related to behavior of malware and collection information related to date and time when the malware is collected;
    classifying the malware into a plurality of first groups based on the behavior information;
    classifying the malware classified into the plurality of first groups into a plurality of second groups based on the collection information;
    detecting an activity trace of the malware from the behavior information; and
    generating trace information of the malware from the activity trace indicated by the malware classified into the plurality of second groups,
    wherein the process further includes executing the malware in an isolated environment, and acquiring an API (Application Programming Interface) trace related to an API called during the malware execution as the behavior information.

* * * * *